(12) United States Patent
Jena et al.

(10) Patent No.: US 11,615,377 B2
(45) Date of Patent: Mar. 28, 2023

(54) PREDICTING HIRING PRIORITIES

(71) Applicant: Microsoft Technology Licensing, LLC, Redmond, WA (US)

(72) Inventors: Suvendu Kumar Jena, San Francisco, CA (US); Theodore E. Chestnut, Montclair, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 502 days.

(21) Appl. No.: 16/445,944

(22) Filed: Jun. 19, 2019

(65) Prior Publication Data

US 2020/0402014 A1    Dec. 24, 2020

(51) Int. Cl.
*G06Q 10/1053* (2023.01)
*G06N 20/00* (2019.01)
(Continued)

(52) U.S. Cl.
CPC ......... *G06Q 10/1053* (2013.01); *G06N 5/046* (2013.01); *G06N 20/00* (2019.01);
(Continued)

(58) Field of Classification Search
CPC ....... G06Q 10/1053; G06Q 10/063112; G06Q 10/0631; G06Q 10/067; G06Q 10/06375; G06N 20/00; G06N 20/10; G06N 20/20
See application file for complete search history.

(56) References Cited

U.S. PATENT DOCUMENTS

2011/0258015 A1* 10/2011 Garrigan .......... G06Q 10/06315
                                                      705/7.25
2017/0032326 A1*  2/2017 Zhao ................ G06Q 10/105
(Continued)

FOREIGN PATENT DOCUMENTS

WO    WO-2019218456 A1 *  11/2019

OTHER PUBLICATIONS

Yao Wei and Li Yuxiang, "Manpower demand forecasting of Strategic Emerging Industry in China: Based on grey system methodology," 2015 Portland International Conference on Management of Engineering and Technology (PICMET), Portland, OR, USA, 2015, pp. 192-203, doi: 10.1109/PICMET.2015.7273042. (Year: 2015).*

*Primary Examiner* — Gabrielle A McCormick
*Assistant Examiner* — Maame Ofori-Awuah
(74) *Attorney, Agent, or Firm* — Schwegman, Lundberg & Woessner, P.A.

(57) ABSTRACT

The disclosed embodiments provide a system for predicting hiring priorities. During operation, the system determines hiring features characterizing hiring activity by a company for a set of titles. Next, the system applies a first machine learning model to the hiring features to produce a first set of scores representing future hiring volumes and applies a second machine learning model to the hiring features to produce a second set of scores representing future hiring growth. The system then generates a first ranking of the titles by the first set of scores and a second ranking of the titles by the second set of scores. Finally, the system outputs at least a portion of the first ranking as a prediction of future hiring volumes by the company and at least a portion of the second ranking as a prediction of future hiring growth by the company.

17 Claims, 5 Drawing Sheets

(51) Int. Cl.
*G06Q 10/0631* (2023.01)
*G06Q 10/067* (2023.01)
*G06N 5/046* (2023.01)
*G06Q 10/0637* (2023.01)

(52) U.S. Cl.
CPC ....... *G06Q 10/067* (2013.01); *G06Q 10/0631* (2013.01); *G06Q 10/06375* (2013.01); *G06Q 10/063112* (2013.01)

(56) References Cited

U.S. PATENT DOCUMENTS

| 2017/0243166 | A1* | 8/2017 | Montgomery | G06N 20/00 |
| 2019/0266544 | A1* | 8/2019 | Mandala | H04L 41/12 |
| 2020/0034776 | A1* | 1/2020 | Peran | G06N 20/00 |
| 2020/0250603 | A1* | 8/2020 | Rocco | G06Q 10/06315 |

* cited by examiner

PREDICTING HIRING PRIORITIES

BACKGROUND

Field

The disclosed embodiments relate to predictive analytics. More specifically, the disclosed embodiments relate to techniques for predicting hiring priorities for companies.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as client-server applications and/or devices that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals use an online network to locate prospects, maintain a professional image, establish and maintain relationships, and/or engage with other individuals and organizations. Similarly, recruiters use the online network to search for candidates for job opportunities and/or open positions. At the same time, job seekers use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

Figure 1:
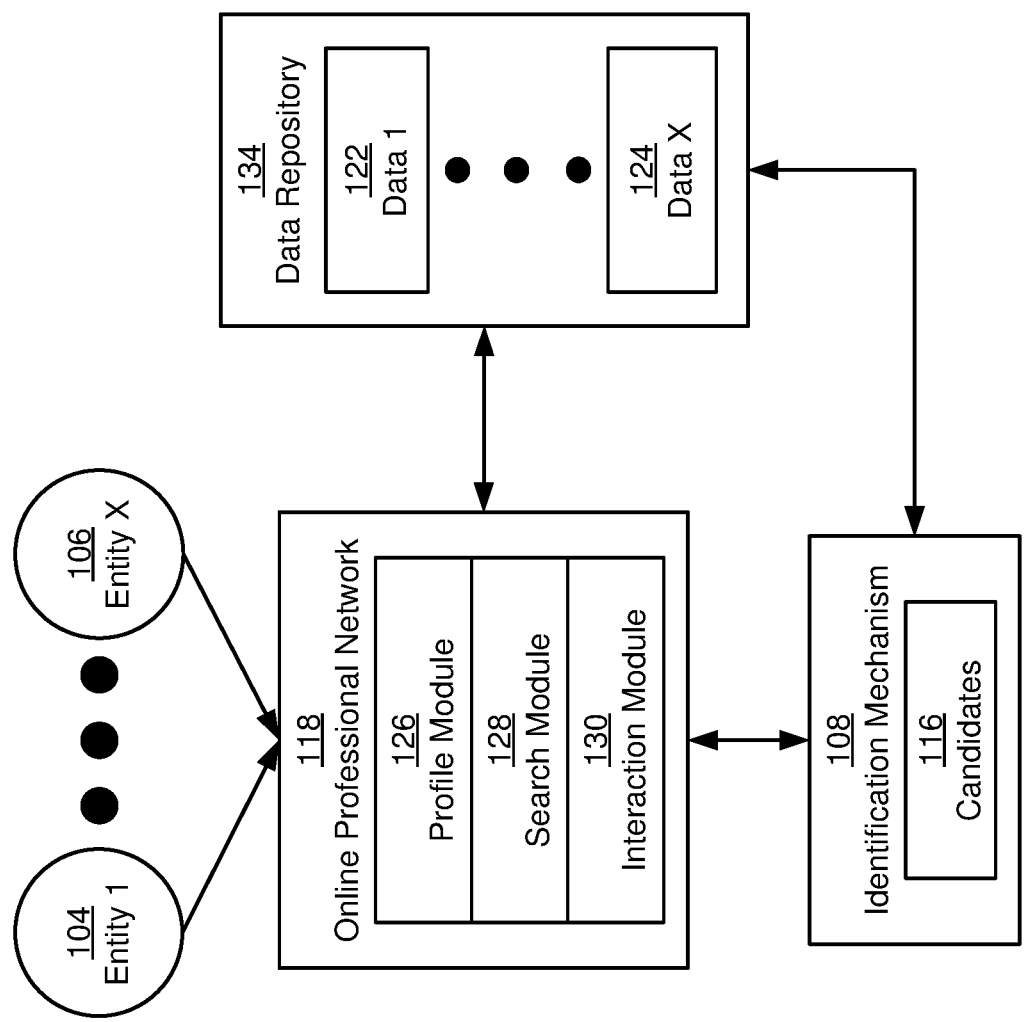
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for predicting hiring priorities associated with companies and/or other entities. In these embodiments, the hiring priorities relate to hiring volumes by the entities for various talent pools (e.g., titles, positions, functions, locations, etc.). For example, a talent pool is identified as a hiring priority for an entity when the entity is predicted to hire a large number or proportion of candidates from or for the talent pool. The hiring priorities also, or instead, relate to hiring growth by the entities for the talent pools. For example, a talent pool is identified as a hiring priority for an entity when the entity is predicted to have significant growth in hiring from or for the talent pool over time.

To predict a company's hiring priorities, features characterizing the company and/or the company's hiring activity are inputted into one or more machine learning models. For example, the features include the company's name, size, age, industry, type, and/or location. The features also, or instead, include counts of hiring messages, recipients of hiring messages, accepted hiring messages, posted jobs, job applications, hires, and/or other interactions or actions related to hiring by the company.

In turn, the machine learning models output scores representing the company's predicted hiring growth and/or hiring volume with respect to different talent pools. For example, each machine learning model produces a set of scores for the company, with each score representing the company's predicted hiring growth and/or hiring volume with respect to a given talent pool. A higher score indicates a higher predicted hiring growth and/or hiring volume by the company for the talent pool, and a lower score indicates a lower predicted hiring growth and/or hiring volume by the company for the talent pool.

Scores outputted by the machine learning models are then used to characterize the company's hiring priorities and/or generate recommendations related to the hiring priorities. Continuing with the above example, the talent pools are ranked by descending score, and a subset of highest-ranked talent pools are identified and outputted as hiring priorities for the company. Recommendations related to hiring goals, hiring strategies, and/or characteristics of the talent pools are also generated and outputted to the company and/or companies in the same industry, location, and/or company size. Recommendations related to matching jobs at the company with qualified candidates in the talent pools can also be produced.

By applying machine learning models to metrics and/or features related to hiring activity at a large number of companies (or other entities) to predict hiring volume, hiring growth, and/or other hiring priorities of the companies with respect to a number of talent pools, the disclosed embodiments provide a comprehensive view of current and/or future hiring patterns at the companies. In addition, the output of the machine learning models can be tested, validated, and/or updated over time, which improves the accuracy of the predictions and/or allows the machine learning models to adapt to changes in the hiring activity and/or talent pools over time. The output of the machine learning models can further be used to generate recommendations that allow the companies to understand high-priority talent pools and/or develop hiring strategies, goals, and/or budgets for the talent pools. As a result, the recommendations improve the efficiency and/or effectiveness of hiring by the companies.

In contrast, conventional techniques lack the ability to quantitatively and systematically identify or predict hiring priorities based on large volumes of numeric features for companies and/or other entities. Instead, the conventional techniques rely on surveys or queries of sales professionals, consultants, and/or other users involved in developing hiring strategies for companies to identify hiring priorities of the companies. The conventional techniques also, or instead, extrapolate hiring patterns or trends from ad hoc historical data sets. Both methodologies involve significant overhead and/or manual analysis by users, which limits the number and types of analysis that can be performed. Such methodologies also involve human intuition and/or bias and thus are error-prone and/or inaccurate. In turn, insights and/or recommendations related to predictions generated by the conventional techniques may be incomplete and/or inaccurate, which causes the companies to expend time, effort, and/or resources on hiring efforts before positive and/or desired outcomes are achieved. Computer systems used by the companies to post jobs, recruit, perform applicant tracking, and/or hire applicants additionally incur processing, querying, storage, network, and/or other overhead in supporting the extended hiring efforts, which reduces the performance and/or available bandwidth on the computer systems. Consequently, the disclosed embodiments improve computer systems, applications, user experiences, tools, and/or technologies related to user recommendations, predictive analytics, employment, recruiting, and/or hiring.

Predicting Hiring Priorities

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 is inputted into the machine learning model(s), along with features and/or characteristics of the corresponding opportunities (e.g., required or desired skills, education, experience, industry, title, etc.). In turn, the machine learning model(s) output scores representing the strengths of candidates 116 with respect to the opportunities and/or qualifications related to the opportunities (e.g., skills, current position, previous positions, overall qualifications, etc.). For example, the machine learning model(s) generate scores based on similarities between the candidates' profile data with online network 118 and descriptions of the opportunities. The model(s) further adjust the scores based on social and/or other validation of the candidates' profile data (e.g., endorsements of skills, recommendations, accomplishments, awards, patents, publications, reputation scores, etc.). The rankings are then generated by ordering candidates 116 by descending score.

In turn, rankings based on the scores and/or associated insights improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may output a ranking of candidates for a given set of job qualifications as search results to a recruiter after the recruiter performs a search with the job qualifications included as parameters of the search. In a fourth example, the component(s) may recommend jobs to a candidate based on the predicted relevance or attractiveness of the jobs to the candidate and/or the candidate's likelihood of applying to the jobs.

In one or more embodiments, online network 118 includes functionality to predict hiring priorities associated with companies and/or other entities. For example, online network 118 analyzes behavior related to hiring and/or job seeking for a given company and a set of job titles to predict subsequent hiring growth and/or hiring volume of the company with respect to each job title. In turn, the predicted hiring growth and/or hiring volume can be used to guide the company's hiring goals and/or strategies, target candidates with certain jobs at the company, and/or generate other recommendations or insights related to hiring by the company and/or job seeking by the candidates.

Figure 2:
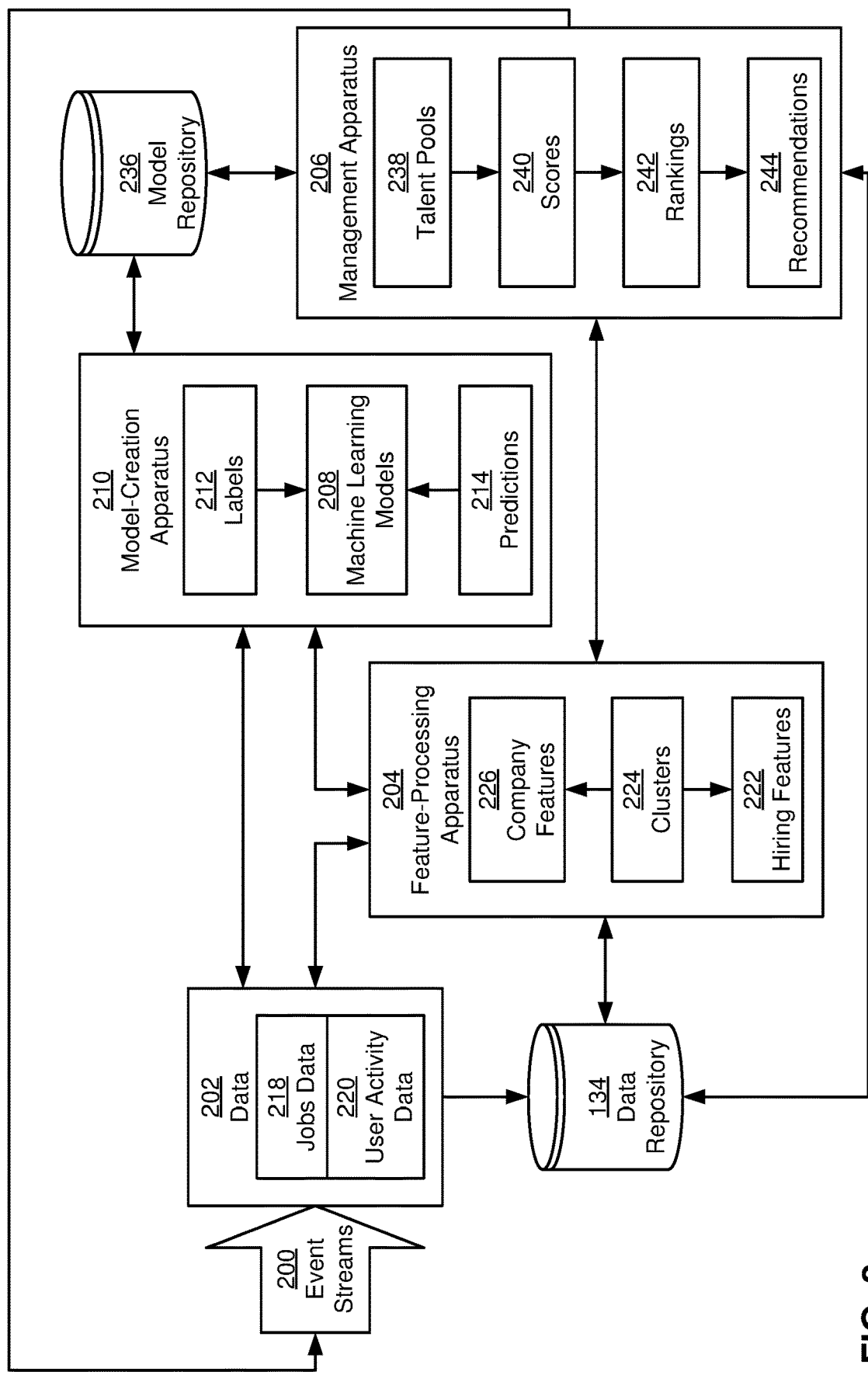
FIG. 2 shows a system for predicting hiring priorities in accordance with the disclosed embodiments.

As shown in FIG. 2, data repository 134 and/or another primary data store are queried for data 202 that includes jobs data 218 for jobs that are listed or described within or outside the online system and/or user activity data 220 that tracks the members' activity within and/or outside the online system.

Jobs data 218 includes structured and/or unstructured data for job listings and/or job descriptions that are posted and/or provided by members of the online system. For example, jobs data 218 for a given job or job listing include a declared or inferred title, company, required or desired skills, responsibilities, qualifications, role, location, industry, seniority, salary range, benefits, and/or member segment.

User activity data 220 includes records of user interactions with one another and/or content associated with the platform. For example, user activity data 220 tracks impressions, clicks, likes, dislikes, shares, hides, comments, posts, updates, conversions, and/or other user interaction with content in the platform. User activity data 220 also, or instead, tracks other types of activity, including connections, messages, job applications, job searches, recruiter searches for candidates, interaction between candidates 116 and recruiters, and/or interaction with groups or events.

In some embodiments, user activity data 220 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User activity data 220 additionally includes schedules, calendars, and/or upcoming availabilities of the users, which may be used to schedule meetings, interviews, and/or events for the users. User activity data 220 is optionally used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

In one or more embodiments, jobs data 218, user activity data 220, and/or other data 202 in data repository 134 is standardized before the data is used by components of the system. For example, skills in jobs data 218 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform such as Apache Kafka (Kafka™ is a registered trademark of the Apache Software Foundation). One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis.

A feature-processing apparatus 204 uses data 202 from event streams 200 and/or data repository 134 to calculate a set of features for a company and/or another entity involved in hiring. For example, feature-processing apparatus 204 executes on an offline, periodic, and/or batch-processing basis to produce features for a large number of companies and/or hiring entities. In another example, feature-processing apparatus 204 generates features in an online, nearline, and/or on-demand basis based on recent hiring activity and/or access to the online system by a company and/or hiring entity.

In one or more embodiments, feature-processing apparatus 204 generates company features 226 for the company and hiring features 222 between the company and a set of talent pools 238. Company features 226 includes attributes related to the company (or hiring entity). For example, company features 226 include a name, identifier, size (e.g., a number of employees at the company), industry, age, company type (e.g., small, medium, enterprise, non-profit, educational institution, etc.), and/or location (e.g., city, state, region, country, etc.) of the company.

Hiring features 222 characterize the hiring activity of the company with respect to talent pools 238. Each talent pool represents a set of candidates that share one or more attributes. For example, a talent pool includes candidates with the same job title, location, industry, seniority, function, employer, and/or company size. The talent pool also, or instead, includes candidates that are qualified or eligible for consideration for jobs with a given job title, industry, seniority, function, location, employer, and/or company size.

In some embodiments, hiring features 222 include counts of interactions or actions related to hiring by the company. For example, hiring features 222 include the number of unique candidates that received hiring messages from the company (e.g., messages related to hiring of the candidates for jobs at the company), the number of hiring messages sent by the company, the number of hiring messages accepted by the candidates (e.g., the number of hiring messages with positive responses and/or indications of interest from the corresponding candidates), and/or the number of hiring messages rejected by the candidates (e.g., the number of hiring messages with negative responses and/or indications of lack of interest from the corresponding candidates). Hiring features 222 also, or instead, include the number of hires made by the company, the number of applications to jobs at the company, the number of unique applicants to jobs at the company, the number of views of jobs posted by the company, and/or the number of jobs posted by the company.

In some embodiments, feature-processing apparatus 204 includes, in hiring features 222, different counts of hiring activity over different time periods. For example, feature-processing apparatus 204 generates counts of hiring messages, accepted hiring messages, rejected hiring messages, candidates receiving hiring messages, hires, job applications, job applicants, jobs, job views, and/or other hiring features 222 for the company over three consecutive six-month periods. The most recent sixth-month period is associated with the most recent counts of hiring interactions or activity, the middle six-month period is associated with "previous" counts of the hiring interactions or activity, and the oldest six-month period is associated with "previous to previous" counts of the hiring interactions or activity. In other words, feature-processing apparatus 204 generates a "current" set of hiring features 222 for the most recent six-month period, a "previous" set of hiring features 222 for the middle six-month period, and a "previous to previous" set of hiring features 222 for the oldest six-month period.

Hiring features 222 also, or instead, include one or more sets of metrics that track growth in the interactions or entities over time. Such metrics include, but are not limited to, the growth in hiring messages, candidates receiving hiring messages, jobs, job views, job applications, job applicants, and/or hires by the company. Continuing with the above example, feature-processing apparatus 204 divides the "previous" set of hiring features 222 for the middle six-month period by the "previous to previous" set of hiring features 222 for the oldest six-month period to generate a set of "previous hiring growth" features that measure the change in counts of hiring activity from the oldest six-month period to the middle six-month period. Similarly, feature-processing apparatus 204 divides the "current" set of hiring features 222 for the most recent six-month period by the "previous" set of hiring features 222 for the middle six-month period to produce a set of "current hiring growth" features that measure the change in counts of hiring activity from the middle six-month period to the most recent six-month period.

In one or more embodiments, feature-processing apparatus 204 calculates hiring features 222 for a given company (or other hiring entity) and a set of talent pools 238. For example, talent pools 238 are represented by standardized titles in data repository 134. As a result, feature-processing apparatus 204 calculates a different set of "current," "previous," and/or "previous-to-previous" hiring features 222 for the company and each standardized title. Within a given set of hiring features 222, each hiring feature measures the count and/or growth of a given hiring action by the company for a corresponding standardized title.

In one or more embodiments, feature-processing apparatus 204 and/or another component perform analysis of company features 226 and/or hiring features 222 using clusters 224 of the features. For example, the component uses a k-means clustering technique and/or another clustering technique to group company features 226 and/or hiring features 222 into a number of clusters 224. Each cluster contains common and/or similar values of company features 226 and/or hiring features 222 from different company-talent pool combinations within the same company size, industry, location, and/or another attribute shared by a set of companies or hiring entities. In turn, the component analyzes relationships and/or pair-wise feature correlations within and/or across clusters 224 to identify patterns in hiring within a given company size, industry, location, and/or other hiring entity attribute.

The component additionally uses the relationships and/or feature correlations to identify one or more hiring features 222 that can be predicted based on other hiring features 222 and/or company features 226. For example, the component identifies that a current or latest value of the number of hires and/or the growth in hires over time at a given company is correlated with and/or can be predicted using previous hiring activity or growth by the company.

In turn, the component generates labels 212 from a subset of hiring features 222 that can be predicted from other hiring features 222 and/or company features 226. For example, the component generates labels 212 from the "current" count of hires and/or measures of hiring growth for the most recent six-month period. The component also groups labels 212 with the corresponding company features 226 and "previous" counts of hiring actions and/or measures of hiring growth that can be used to predict labels 212 to generate training data for one or more machine learning models 208. The component then stores the features and corresponding labels 212 in data repository 134 for subsequent retrieval and use. The component may also, or instead, provide the features to a model-creation apparatus 210, a management apparatus 206, and/or another component of the system for use in creating and/or executing machine learning models 208 using the features.

Model-creation apparatus 210 trains and/or updates one or more machine learning models 208 using sets of features from feature-processing apparatus 204, labels 212 associated with the feature sets, and predictions 214 produced from the feature sets. In general, model-creation apparatus 210 may produce machine learning models 208 that generate predictions and/or estimates related to hiring volume, hiring growth, and/or other hiring priorities of companies and/or other hiring entities.

More specifically, model-creation apparatus 210 obtains company features 226, hiring features 222, and labels 212 generated by feature-processing apparatus 204 from feature-processing apparatus 204 and/or data repository 134. Next, model-creation apparatus 210 inputs company features 226, hiring features, and labels 212 as training data for one or more regression models, random forests, neural networks, deep learning models, and/or other types of machine learning models 208. Model-creation apparatus 210 then uses a training technique and/or one or more hyperparameters to update parameter values of machine learning models 208 so that predictions 214 outputted by machine learning models 208 from the features reflect the corresponding labels 212.

In one or more embodiments, machine learning models 208 include a first machine learning model that predicts hiring volume for a given company-talent pool combination and a second machine learning model that predicts hiring growth for a given company-talent pool combination. Features inputted into each machine learning model include company features 226 for the company and a "previous" set of hiring features 222 calculated for the company and the talent pool. The first machine learning model uses the inputted features to predict, for the company-talent pool combination, a label with a value set to the "current" number of hires from hiring features 222 calculated for the company and the talent pool. The second machine learning model uses the inputted features to predict, for the company-talent pool combination, a label with a value set to the "current" hiring growth (i.e., the current number of hires divided by the previous number of hires) from hiring features 222 for the company and the latent pool.

In some embodiments, model-creation apparatus 210, feature-processing apparatus 204, and/or another component perform one or more scalings and/or other transformations of numeric features in company features 226 and/or hiring features 222 before inputting the features into machine learning models 208. One transformation includes converting each count of a hiring action for a given company-talent pool combination into a proportion of the hiring action across all counts of the same hiring action by the company. For example, a numeric feature specifying 10 hiring messages by the company to candidates for a "Data Scientist" job or candidates with the "Data Scientist" job title is divided by 100 total hiring messages by the company to all candidates over the same period to obtain a proportion of 0.1 for the numeric feature.

Another transformation includes a min-max normalization that converts a range of values associated with a feature into a normalized range of 0 to 1. An example representation of the min-max normalization includes the following:

$$X\_std = (X - X \cdot \min)/(X \cdot \max - X \cdot \min)$$

$$X\_scaled = X\_std * (\max - \min) + \min$$

In the above example, "X_std" represents a normalized value of a feature named "X." The normalized value is calculated by subtracting the minimum value of "X" (e.g., the minimum value of the feature across all companies and/or within the same company, company size, industry, location, etc.) from a given value for "X" and dividing the result by the difference between the maximum value of "X" (e.g., the maximum value of the feature across all companies and/or within the same company, company size, industry, location, etc.) and the minimum value of "X." "X_scaled" represents a "scaled" version of "X" that is optionally calculated from "X_std" to rescale each value of "X" to fall between a different "min" and "max" value (e.g., a min that is not 0 and a max that is not 1).

After machine learning models 208 are trained and/or updated, model-creation apparatus 210 stores parameters of machine learning models 208 in a model repository 236. For example, model-creation apparatus 210 replaces old values of the parameters in model repository 236 with the updated parameters, or model-creation apparatus 210 stores the updated parameters separately from the old values (e.g., by storing each set of parameters with a different version number of the corresponding machine learning model).

A management apparatus 206 uses the latest versions of machine learning models 208 to generate scores 240, rankings 242, and/or recommendations 244 related to hiring activity associated with companies and talent pools 238. First, management apparatus 206 identifies talent pools 238 that are relevant or related to a given company. For example, management apparatus 206 defines each talent pool to have a common job title, industry, seniority, company, company size, location, and/or another attribute related to candidates or jobs. Management apparatus 206 also, or instead, customizes talent pools 238 to a given company (or hiring entity) by selecting one or more attributes that are important to the company in conducting hiring activities and/or analyzing hiring trends.

For each combination of the company (or hiring entity) and a different talent pool, management apparatus 206 retrieves company features 226 and hiring features 222 from feature-processing apparatus 204 and/or data repository 134. Next, management apparatus 206 applies machine learning models 208 to the features to generate one or more sets of scores 240 representing the company's predicted hiring priorities. As with the generation of features inputted into machine learning models 208, scores 240 may be produced in an offline, batch-processing, and/or periodic basis (e.g., from batches of features), or scores 240 may be generated in an online, nearline, and/or on-demand basis (e.g., when a new set of features is available for the company, when the company or a user requests scores 240 for the company, when a representative of the company logs into the online system, when the representative performs a hiring action, etc.).

In some embodiments, management apparatus 206 applies a first machine learning model from model-creation apparatus 210 and/or model repository 236 to company features 226 and hiring features 222 for the company and multiple talent pools 238 to generate a first set of scores representing future hiring volumes by the company for talent pools 238. Each score in the first set of scores represents the number of hires by the company for a corresponding talent pool, a proportion of hires by the company for the talent pool, and/or another numeric representation of hiring by the company for the talent pool.

Management apparatus 206 also, or instead, applies a second machine learning model from model-creation apparatus 210 and/or model repository 236 to company features 226 and hiring features 222 for the company and multiple talent pools 238 to generate a second set of scores representing future hiring growth by the company for the corresponding talent pools 238. Each score in the second set of scores represents the growth or change in the number of hires by the company for a corresponding talent pool, the growth or change in the proportion of hires by the company for the talent pool, and/or another numeric representation of growth or change in hiring by the company for the talent pool over time.

In one or more embodiments, features used to generate scores 240 span one or more time periods prior to the current time, and scores 240 represent predictions of hiring volumes or hiring growth by the company for a current or future time period. For example, management apparatus 206 requests and/or collects hiring features 222 spanning one or more six-month periods prior to the current time for the company and a set of talent pools 238. Management apparatus 206 inputs the features into a first machine learning model from mode-creation apparatus 210 and/or model repository 236, and the first machine learning model outputs scores 240 representing predictions 214 of hiring volume by the company for talent pools 238 over a current or future six-month period. Management apparatus 206 also, or instead, inputs the features into a second machine learning model from mode-creation apparatus 210 and/or model repository 236, and the second machine learning model outputs scores 240 representing predictions 214 of hiring growth by the company for talent pools 238 over a current or future six-month period.

Management apparatus 206 then generates rankings 242 of talent pools 238 by the corresponding sets of scores 240. For example, management apparatus 206 ranks job titles and/or other representations of talent pools 238 by descending predicted hiring volume. Management apparatus 206 also, or instead, ranks job titles and/or other representations of talent pools 238 by descending predicted hiring growth.

Finally, management apparatus 206 outputs some or all talent pools 238 in rankings 242 as recommendations 244 related to the company. For example, management apparatus 206 displays a pre-specified number of highest-ranked talent pools 238 and/or a variable number of talent pools 238 with scores 240 that exceed a threshold (e.g., a numeric threshold, a percentile threshold, etc.) in each ranking as recommendations 244 related to the company's future hiring activity. Such recommendations 244 can be shown to a hiring manager, recruiter, human resources professional, executive, and/or another member involved in hiring at the company. Recommendations 244 can also, or instead, be provided to customer service representatives, sales professionals, consultants, and/or other users that assist the company with developing and/or executing hiring strategies, hiring goals, and/or hiring activities.

In another example, management apparatus 206 identifies talent pools 238 with high scores 240 and/or positions in rankings 242 for a set of companies that share a location, industry, company size, and/or other attributes. When a talent pool has a high score and/or ranking position for multiple companies in the set, management apparatus 206 outputs the talent pool as a hiring priority for companies represented by the shared attribute(s). In turn, representatives of the companies can use the outputted talent pools 238 to focus hiring efforts, strategies, and/or resources on the talent pools and/or shift hiring from other talent pools to the outputted talent pools. Similarly, other companies that are interested in entering or expanding to the same location, industry, company size, and/or other shared attribute(s) of the companies can use the outputted talent pools 238 to plan and/or conduct hiring activity that aligns with existing companies associated with the shared attribute(s).

In some embodiments, management apparatus 206 includes functionality to generate additional recommendations 244 related to hiring by the company based on scores 240 and/or rankings 242. For example, management apparatus 206 includes, in a "Talent Insights" feature that is provided by and/or accessed through the online system, recommendations 244 of reports related to talent pools 238 that are important to a given company, location, industry, and/or company size. The reports include information such as, but not limited to, the total number of employees, growth rate, attrition rate, and/or average tenure in a given talent pool, company, and/or industry; top roles or functions occupied by employees in the talent pool, company, and/or industry; and/or companies or industries to or from which employees move.

In another example, management apparatus 206 identifies talent pools 238 that are hiring priorities for a company and/or other companies with the same location, industry, and/or company size. Management apparatus 206 compares predicted and/or historical hiring growth and/or volume by the company with the other companies and generates recommendations 244 of future hiring growth, hiring volume, and/or other hiring strategies for the company to allow the company to compete or keep up with the other companies. Management apparatus 206 also, or instead, estimates a hiring budget for the company with a given talent pool based on the recommended hiring growth and/or hiring volume for the talent pool, the supply of candidates in the talent pool, demand for candidates in the talent pool, and/or salaries or costs associated with employees in the talent pool. Management apparatus 206 then outputs the estimated hiring budget as guidance for the company's hiring activity or strategy in the talent pool.

By applying machine learning models to metrics and/or features related to hiring activity at a large number of companies (or other entities) to predict hiring volume, hiring growth, and/or other hiring priorities of the companies with respect to a number of talent pools, the disclosed embodiments provide a comprehensive view of current and/or future hiring patterns at the companies. In addition, the output of the machine learning models can be tested, validated, and/or updated over time, which improves the accuracy of the predictions and/or allows the machine learning models to adapt to changes in the hiring activity and/or talent pools over time. The output of the machine learning models can further be used to generate recommendations that allow the companies to understand high-priority talent pools and/or develop hiring strategies, goals, and/or budgets for the talent pools. As a result, the recommendations improve the efficiency and/or effectiveness of hiring by the companies.

In contrast, conventional techniques lack the ability to quantitatively and systematically identify or predict hiring priorities based on large volumes of numeric features for companies and/or other entities. Instead, the conventional techniques rely on surveys or queries of sales professionals, consultants, and/or other users involved in developing hiring strategies for companies to identify hiring priorities of the companies. The conventional techniques also, or instead, extrapolate hiring patterns or trends from ad hoc historical data sets. Both methodologies involve significant overhead and/or manual analysis by users, which limits the number and types of analysis that can be performed. Such methodologies also involve human intuition and/or bias and thus are error-prone and/or inaccurate. In turn, insights and/or recommendations related to predictions generated by the conventional techniques may be incomplete and/or inaccurate, which causes the companies to expend time, effort, and/or resources on hiring efforts before positive and/or desired outcomes are achieved. Computer systems used by the companies to post jobs, recruit, perform applicant tracking, and/or hire applicants additionally incur processing, querying, storage, network, and/or other overhead in supporting the extended hiring efforts, which reduces the performance and/or available bandwidth on the computer systems. Consequently, the disclosed embodiments improve computer systems, applications, user experiences, tools, and/or technologies related to user recommendations, predictive analytics, employment, recruiting, and/or hiring.

Those skilled in the art will appreciate that the system of FIG. 2 may be implemented in a variety of ways. First, feature-processing apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Feature-processing apparatus 204, model-creation apparatus 210, and management apparatus 206 may additionally be implemented together and/or separately by one or more hardware and/or software components and/or layers.

Second, a number of machine learning models 208 and/or techniques may be used to generate predictions 214, scores 240, rankings 242, and/or recommendations 244. For example, the functionality of each machine learning model may be provided by a regression model, artificial neural network, support vector machine, decision tree, gradient boosted tree, random forest, naïve Bayes classifier, Bayesian network, clustering technique, collaborative filtering technique, deep learning model, hierarchical model, ensemble model, and/or another type of machine learning technique. The retraining or execution of each machine learning model may also be performed on an offline, online, and/or on-demand basis to accommodate requirements or limitations associated with the processing, performance, or scalability of the system and/or the availability of features and labels 212 used to train the machine learning model. Multiple versions of a machine learning model may further be adapted to different subsets of hiring entities (e.g., companies, industries, locations, company sizes, etc.) and/or talent pools (e.g., job titles, seniorities, salary ranges, locations, functions, companies, company sizes, etc.). Conversely, the same machine learning model may be used to generate scores 240 for all hiring entities and talent pools 238.

Third, the system of FIG. 2 may be adapted to predict priorities and/or future actions for other platforms. For example, the system may be used to predict volume and/or growth in marketing, advertising, sales, revenue, profit, manufacturing, research and development, trade, and/or other activity by companies or other entities.

Figure 3:
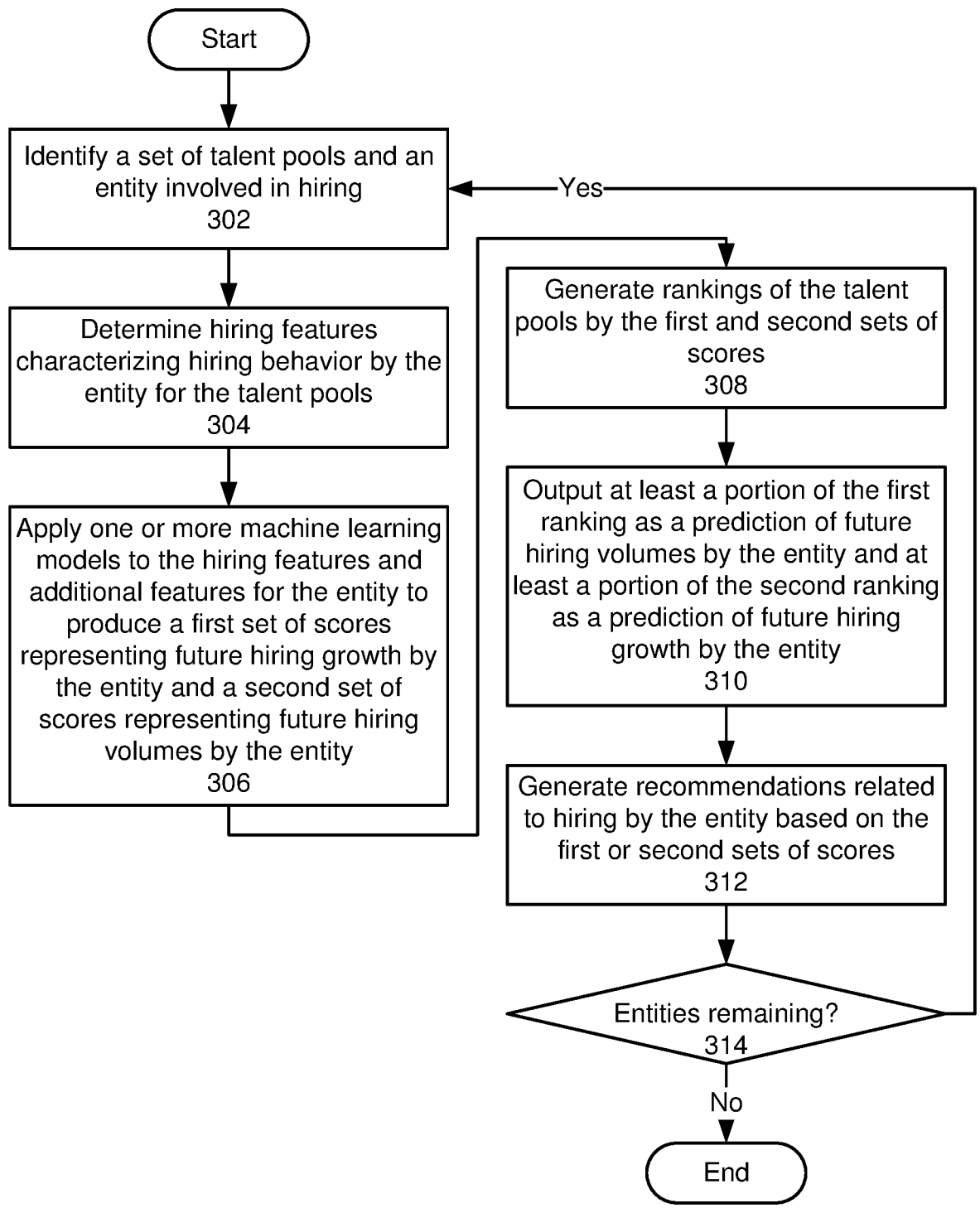
FIG. 3 shows a flowchart illustrating a process of predicting hiring priorities in accordance with the disclosed embodiments.

FIG. 3 shows a flowchart illustrating a process of predicting hiring priorities in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of talent pools and an entity involved in hiring are identified (operation 302). The talent pools may be defined to include employees, candidates, and/or other users that share a current or prospective job title, location, company, company size, industry, seniority, function, and/or another employment-related attribute. The entity may be defined to span a company, industry, location, company size, and/or another attribute related to companies or organizations that perform hiring.

Next, hiring features characterizing hiring behavior by the entity for the talent pools are determined (operation 304). The hiring features include counts of hiring actions by the entity for each talent pool. For example, the hiring features include, for each talent pool, the number of candidates that received hiring messages from the entity, the number of hiring messages sent by the entity, the number of hiring messages accepted or rejected by the candidates, the number of hires made by the entity, the number of applications for jobs at the entity, the number of applicants for jobs at the entity, and/or the number of jobs posted by the entity. Such hiring features are calculated by aggregating the corresponding actions over a given time period (e.g., a number of weeks or months).

The hiring features also, or instead, include measures of growth for each action over time. For example, the hiring features include, for each talent pool, the growth in the number of candidates receiving hiring messages from the entity, the growth in the number of hiring messages from the entity, the growth in the number of hiring messages from the entity that are accepted or rejected by the candidates, the growth in the number of hires made by the entity, the growth in the number of applications for jobs posted by the entity, the growth in the number of applicants for jobs posted by the entity, and/or the growth in the number of jobs posted by the entity. Each measure of growth is calculated by dividing the count of a corresponding action over a given time period by the count of the same action over a previous time period.

One or more machine learning models are applied to the hiring features and additional features for the entity to produce a first set of scores representing future hiring volumes by the entity and a second set of scores representing future hiring growth by the entity (operation 306). For example, the additional features include a company identifier, company size, company name, company age, company type, company industry, and/or company location associated with the entity. The hiring features and additional features are inputted into two separate machine learning models and/or the same machine learning model to obtain the first and second sets of scores. Each score in the first set of scores represents the number of hires by the entity for a corresponding talent pool, a proportion of hires by the entity for the talent pool, and/or another numeric representation of hiring by the entity for the talent pool. Each score in the second set of scores represents the growth or change in the number of hires by the entity for a corresponding talent pool, the growth or change in the proportion of hires by the entity for the talent pool, and/or another numeric representation of growth or change in hiring by the entity for the talent pool over time.

Rankings of the talent pools are generated by the first and second sets of scores (operation 308). For example, the talent pools are ranked by descending score in the first set of scores to generate a first ranking, and the talent pools are ranked by descending scores in the second set of scores to generate a second ranking.

At least a portion of the first ranking is outputted as a prediction of future hiring volumes by the entity, and at least a portion of the second ranking is outputted as a prediction of future hiring growth by the entity (operation 310). For example, a pre-specified and/or variable number of top-ranked talent pools from the first and second rankings are outputted and/or stored as hiring priorities for the entity.

Recommendations related to hiring by the entity are additionally generated based on the first or second sets of scores (operation 312). For example, the recommendations include a hiring strategy and/or hiring budget related to a talent pool that is identified as a priority for the entity and/or related entities. The recommendations also, or instead, include reports that include characteristics and/or insights related to the talent pool, such as the total number of employees, growth rate, attrition rate, and/or average tenure in a the talent pool; top roles or functions occupied by employees in the talent pool; and/or companies or industries to or from which employees in the talent pool move.

Operations 302-312 are repeated for remaining entities (operation 314). For example, scores, rankings, and/or recommendations are generated and/or outputted for entities representing various companies, company sizes, industries, locations, and/or other attributes.

Figure 4:
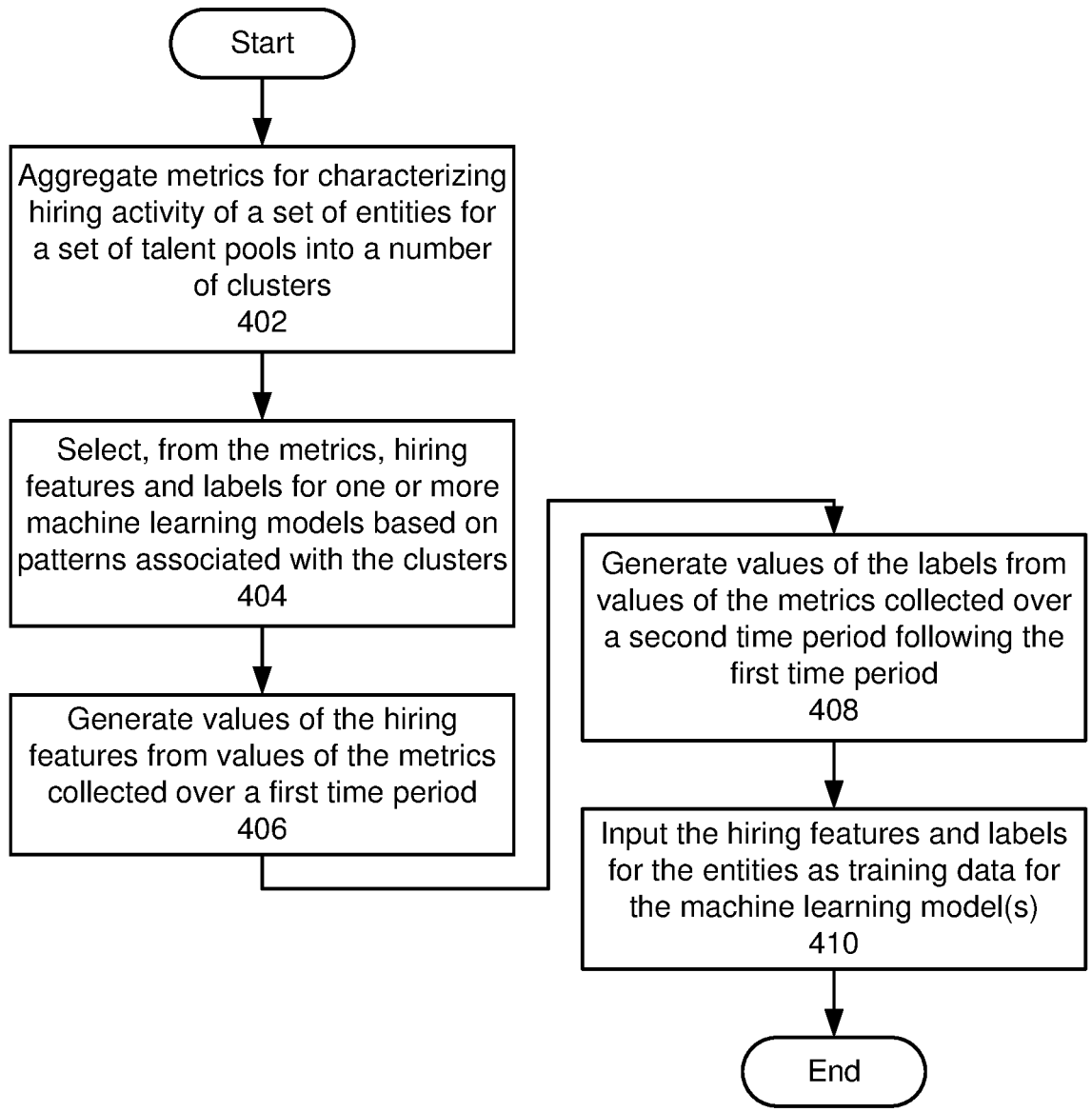
FIG. 4 shows a flowchart illustrating a process of training a machine learning model to predict hiring priorities in accordance with the disclosed embodiments.

FIG. 4 shows a flowchart illustrating a process of training a machine learning model to predict hiring priorities in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, metrics for characterizing hiring activity of a set of entities for a set of talent pools are aggregated into a number of clusters (operation 402). For example, the metrics include current and/or previous counts or measures of growth for different hiring actions by the entities for individual talent pools. A k-means clustering technique and/or another type of clustering technique are used to generate clusters of common and/or similar entity attributes and/or metric values. A separate set of clusters is generated for each company size, industry, and/or other attribute associated with the entities to identify patterns in hiring activity within and across different segments of entities.

Next, hiring features and labels for one or more machine learning models are selected based on patterns associated with the clusters (operation 404). For example, the clusters are used to identify correlations among the metrics that allow certain values of the metrics to be predicted using past values of the same metrics and/or different metrics. In turn, a label is assigned to each metric that can be predicted, and features associated with the label are obtained from other metrics that can be used to predict the metric.

Values of the hiring features are generated from values of the metrics collected over a first time period (operation 406), and values of the labels are generated from values of the metrics collected over a second time period following the first time period (operation 408). For example, a label for a predicted hiring volume is obtained from a count or proportion of hiring by the entity over a most recent period (e.g., a number of weeks or months), and features used to predict the hiring volume are obtained from counts, proportions, and/or growth of various hiring actions by the entity over one or more periods preceding the most recent period. In another example, a label for a predicted hiring growth is obtained from a measure of hiring growth by the entity over one or more most recent periods, and features used to predict the hiring growth are obtained from counts, proportions, and/or growth of various hiring actions by the entity over one or more periods preceding the most recent period(s).

Finally, the hiring features and labels for the entities are inputted as training data for the machine learning model(s) (operation 410). Prior to inputting the features into a machine learning model, numeric features are scaled by converting each numerical feature for an entity and a talent pool into a proportion of the numerical feature within the entity and/or converting a range of a numerical feature to a normalized range of 0 to 1. In turn, each machine learning model learns to predict a given label value based on a corresponding set of feature values.

Figure 5:
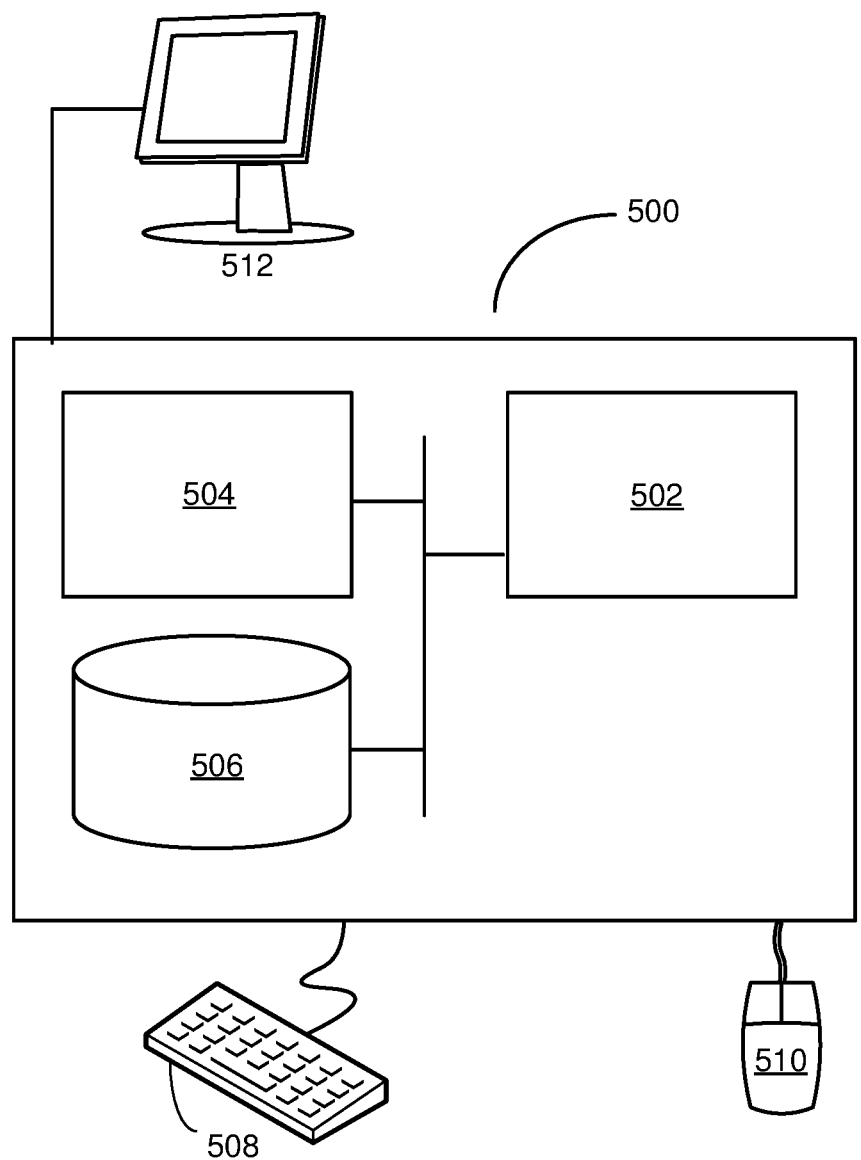
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 also includes input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for predicting hiring priorities. The system includes a feature-processing apparatus, a model-creation apparatus, and a management apparatus, one or more of which may alternatively be termed or implemented as a module, mechanism, or other type of system component. The model-creation apparatus aggregates metrics for characterizing the hiring activity of a set of companies (or entities) for a set of titles (or talent pools) into a number of clusters. Next, the model-creation apparatus selects, from the metrics, hiring features and labels based on patterns associated with the number of clusters. The model-creation apparatus then inputs the hiring features and the labels for the set of companies as training data for a first machine learning model and a second machine learning model.

The feature-processing apparatus determines hiring features characterizing hiring activity by a company (or entity) for a set of titles (or talent pools). Next, the management apparatus applies the first machine learning model to the hiring features to produce a first set of scores representing future hiring volumes and applies the second machine learning model to the hiring features to produce a second set of scores representing future hiring growth. The management apparatus then generates a first ranking of the titles by the first set of scores and a second ranking of the titles by the second set of scores. Finally, the management apparatus outputs at least a portion of the first ranking as a prediction of future hiring volumes by the company and at least a portion of the second ranking as a prediction of future hiring growth by the company.

In addition, one or more components of computer system 500 may be remotely located and connected to the other components over a network. Portions of the present embodiments (e.g., feature-processing apparatus, model-creation apparatus, management apparatus, data repository, model repository, online network, etc.) may also be located on different nodes of a distributed system that implements the embodiments. For example, the present embodiments may be implemented using a cloud computing system that predicts hiring priorities for a set of remote entities and/or talent pools.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   with training data relating to previous hiring activity of companies, training both a first machine learning model to produce a first set of scores representing future hiring volumes and a second machine learning model to produce a second set of scores representing future hiring growth, the training further comprising:
   generating clusters of hiring features associated with identified patterns of hiring activity using k-means clustering,
   generating a set of values of metrics related to hiring activity over a first time period,
   generating a set of labels from the set of values of metrics over a second time period, and
   generating a normalized ranking of the hiring features based on the set of labels;
   selecting hiring features characterizing hiring activity by a company for a set of titles;
   applying, by one or more computer systems, the first trained machine learning model to the hiring features to produce a first set of scores representing future hiring volumes by the company for the set of titles;
   applying the first trained machine learning models to a set of company features to produce a second set of scores representing future hiring growth;
   generating, by the one or more computer systems, a first ranking of the set of titles by the first set of scores and the second set of scores;
   applying the second trained machine learning model to the hiring features to produce a third set of scores representing future hiring growth by the company for the set of titles;
   applying the second trained machine learning model to a set of company features to produce a fourth set of scores;
   generating, by the one or more computer systems, a second ranking of the set of titles by the third set of scores and the fourth set of scores;
   outputting at least a portion of the first ranking as a first prediction of the future hiring volumes by the company for the set of titles; and
   outputting at least a portion of the second ranking as a second prediction of the future hiring growth by the company for the set of titles.

2. The method of claim 1, wherein the set of company features comprise at least one of:
   a company identifier;
   a company size;
   a company name;
   a company age;
   a company type;
   a company industry; and
   a company location.

3. The method of claim 1, further comprising:
aggregating metrics for characterizing the hiring activity of a set of companies for the set of titles into a number of clusters;
selecting, from the metrics, the hiring features and labels for the first and second machine learning models based on patterns associated with the number of clusters; and
inputting the hiring features and the labels for the set of companies as training data for the first and second machine learning models.

4. The method of claim 3, further comprising:
generating the values of the hiring features from values of the metrics collected over a first time period; and
generating the labels from values of the metrics collected over a second time period following the first time period.

5. The method of claim 4, wherein generating the values of the hiring features from the values of the metrics comprises:
converting a numerical feature for the company and a title into a proportion of the numerical feature within the company.

6. The method of claim 4, wherein generating the values of the hiring features from the values of the metrics comprises:
converting a range of a numerical feature to a normalized range of 0 to 1.

7. The method of claim 3, wherein aggregating the metrics for characterizing the hiring activity of the set of companies for the set of titles into the number of clusters comprises:
generating the number of clusters from the metrics for the set of companies associated with a company size and an industry.

8. The method of claim 1, further comprising:
generating a recommendation related to hiring by the company based on the first or third sets of scores.

9. The method of claim 8, wherein the recommendation comprises at least one of:
a hiring strategy;
a hiring budget; and
a characteristic of a talent pool.

10. The method of claim 1, wherein the hiring features comprise at least one of:
a number of candidates that received hiring messages from the company;
a number of hiring messages sent by the company;
a number of hiring messages accepted by the candidates;
a number of hiring messages rejected by the candidates;
a number of hires made by the company;
a number of applications for jobs at the company;
a number of applicants for jobs at the company;
a number of jobs posted by the company; and
a growth in a hiring feature from a first period to a second period.

11. A system, comprising:
one or more processors; and
memory storing instructions that, when executed by the one or more processors, cause the system to:
with training data relating to previous hiring activity of companies, train both a first machine learning model to produce a first set of scores representing future hiring volumes and a second machine learning model to produce a second set of scores representing future hiring growth, the training further comprising:
generate clusters of hiring features associated with identified patterns of hiring activity using k-means clustering,
generate a set of values of metrics related to hiring activity over a first time period,
generate a set of labels from the set of values of metrics over a second time period, and
generate a normalized ranking of the hiring features based on the set of labels;
select hiring features characterizing hiring activity by an entity for a set of talent pools;
apply a first trained machine learning model to the hiring features to produce a first set of scores representing future hiring growth by the entity for the set of talent pools;
apply the first trained machine learning model to a set of company features for the company to produce a second set of scores representing future hiring growth;
generate a first ranking of the set of talent pools by the first set of scores and the second set of scores;
output at least a portion of the first ranking as a first prediction of the future hiring growth by the entity;
apply a second trained machine learning model to the hiring features to produce a third set of scores representing future hiring volumes by the entity for the set of talent pools;
apply the second trained machine learning model to the set of company features for the company to a fourth set of scores;
generate a second ranking of the set of talent pools by the third set of scores and the fourth set of scores; and
output at least a portion of the second ranking as a second prediction of the future hiring volumes by the entity.

12. The system of claim 11, wherein the memory further stores instructions that, when executed by the one or more processors, cause the system to:
aggregate metrics for characterizing the hiring activity of a set of entities for the set of talent pools into a number of clusters;
select, from the metrics, the hiring features and labels for the first and second machine learning models based on patterns associated with the number of clusters; and
input the hiring features and the labels for the set of entities as training data for the first and second machine learning models.

13. The system of claim 12, wherein the memory further stores instructions that, when executed by the one or more processors, cause the system to:
generate the values of the hiring features from values of the metrics collected over a first time period; and
generate the values of the labels from values of the metrics collected over a second time period following the first time period.

14. The system of claim 13, wherein generating the values of the hiring features from the values of the metrics comprises at least one of:
converting a numerical feature for the entity and a talent pool into a proportion of the numerical feature within the entity; and
converting a range of a numerical feature to a normalized range of 0 to 1.

15. The system of claim 11, wherein the set of talent pools comprises at least one of:
a title;
a location;
an industry;
a seniority;
a function;
a company; and
a company size.

16. The system of claim 11, wherein the entity comprises at least one of:
- a company;
- a location;
- an industry; and
- a company size.

17. A non-transitory computer-readable storage medium storing instructions that when executed by a computer cause the computer to perform a method, the method comprising:
- with training data related to previous hiring activity of companies, training both a first machine learning model to produce a first set of scores representing future hiring volumes and a second machine learning model to produce a second set of scores representing future hiring growth, the training further comprising:
- generating clusters of hiring features associated with identified patterns of hiring activity using k-means clustering,
- generating a set of values of metrics related to hiring activity over a first time period,
- generating a set of labels from the set of values of metrics over a second time period, and
- generating a normalized ranking of the hiring features based on the set of labels;
- selecting hiring features characterizing hiring activity by a company for a set of titles;
- applying a first trained machine learning model to the hiring features to produce a first set of scores representing future hiring volumes by the company for the set of titles;
- applying the first trained machine learning model to the company features to produce a second set of scores representing future hiring volumes;
- applying a second trained machine learning model to the hiring features to produce a third set of scores representing future hiring growth by the company for the set of titles;
- applying the second trained machine learning model to the set of company features to produce a fourth set of scores representing future hiring growth;
- generating a first ranking of the set of titles by the first and second set of scores and a second ranking of the set of titles by the third and fourth set of scores;
- outputting at least a portion of the first ranking as a first prediction of the future hiring volumes by the company; and
- outputting at least a portion of the second ranking as a second prediction of the future hiring growth by the company.

* * * * *